US012734831B2

(12) United States Patent
Maezawa

(10) Patent No.: US 12,734,831 B2
(45) Date of Patent: Sep. 15, 2026

(54) INKJET IMAGE FORMING APPARATUS

(71) Applicant: KYOCERA Document Solutions Inc., Osaka (JP)

(72) Inventor: Nobuhiro Maezawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 106 days.

(21) Appl. No.: 19/008,277

(22) Filed: Jan. 2, 2025

(65) Prior Publication Data

US 2025/0222701 A1 Jul. 10, 2025

(30) Foreign Application Priority Data

Jan. 10, 2024 (JP) ................................ 2024-001821

(51) Int. Cl.
*B41M 5/00* (2006.01)
*B41J 3/407* (2006.01)
*B41J 11/00* (2006.01)
*B41J 29/00* (2006.01)

(52) U.S. Cl.
CPC ........... *B41J 11/0015* (2013.01); *B41J 3/407* (2013.01); *B41J 29/00* (2013.01); *B41M 5/0011* (2013.01)

(58) Field of Classification Search
CPC .. B41J 11/0015; B41M 5/0011; B41M 5/0017
See application file for complete search history.

(56) References Cited

U.S. PATENT DOCUMENTS 10,589,557 B2 3/2020 Takaku
2013/0008697 A1* 1/2013 Naganawa ............ C01G 11/00 174/250
2015/0251453 A1* 9/2015 Nakai ................. B41M 5/0011 118/705
2019/0126655 A1 5/2019 Takaku

FOREIGN PATENT DOCUMENTS

JP 6950683 B2 10/2021
WO WO-2018088381 A1 * 5/2018 .............. B65H 5/22

OTHER PUBLICATIONS

Muramatsu, Machine TranslationofWO-2018088381-A1, 2018 (Year: 2018).*

* cited by examiner

*Primary Examiner* — Scott A Richmond
(74) *Attorney, Agent, or Firm* — Studebaker Brackett PLLC

(57) ABSTRACT

An ink jet image forming apparatus includes an image forming part, a corona discharge treatment unit, and a control part. The image forming part ejects ink based on image data on a printing base material conveyed in a predetermined conveyance direction to form an image. The corona discharge treatment unit is disposed on an upstream side of the head unit in the conveyance direction and performs a corona discharge on the printing base material. The control part controls a discharge amount of the corona discharge performed by the corona discharge treatment unit. The control part controls the discharge amount based on an arithmetic average roughness of the printing base material.

4 Claims, 5 Drawing Sheets

| | MANUFACTURER, MODEL NUMBER | ARITHMETIC AVERAGE ROGHNESS (um) | CORONA DISCHARGE TREATMENT | ADHESION |
|---|---|---|---|---|
| PRESENT EXAMPLE 1 | TORAY INDUSTRIES. INC., Lumirror #50-S10 | 0.08 | PERFORMED | ○ |
| PRESENT EXAMPLE 2 | TORAY INDUSTRIES, INC., TORAYFAN #50-2500S | 0.19 | PERFORMED | ○ |
| PRESENT EXAMPLE 3 | TOYOBO CO., LTD., GW703#135 | 0.26 | PERFORMED | ○ |
| PRESENT EXAMPLE 4 | Oji Paper Co., Ltd., MIRRORKOTE Gold 84.9g/m² | 0.38 | NOT PERFORMED | ○ |
| COMPARATIVE EXAMPLE 1 | TORAY INDUSTRIES, INC., Lumirror #50-S10 | 0.08 | NOT PERFORMED | × |
| COMPARATIVE EXAMPLE 2 | TORAY INDUSTRIES, INC., TORAYFAN #50-2500S | 0.19 | NOT PERFORMED | × |
| COMPARATIVE EXAMPLE 3 | TOYOBO CO., LTD., GW703#135 | 0.26 | NOT PERFORMED | △ |

FIG. 5

| | MANUFACTURER, MODEL NUMBER | ARITHMETIC AVERAGE ROGHNESS (um) | CORONA DISCHARGE TREATMENT | ADHESION |
|---|---|---|---|---|
| PRESENT EXAMPLE 1 | TORAY INDUSTRIES, INC., Lumirror #50-S10 | 0.08 | PERFORMED | ○ |
| PRESENT EXAMPLE 2 | TORAY INDUSTRIES, INC., TORAYFAN #50-2500S | 0.19 | PERFORMED | ○ |
| PRESENT EXAMPLE 3 | TOYOBO CO., LTD., GW703#135 | 0.26 | PERFORMED | ○ |
| PRESENT EXAMPLE 4 | Oji Paper Co., Ltd., MIRRORKOTE Gold 84.9g/m² | 0.38 | NOT PERFORMED | ○ |
| COMPARATIVE EXAMPLE 1 | TORAY INDUSTRIES, INC., Lumirror #50-S10 | 0.08 | NOT PERFORMED | × |
| COMPARATIVE EXAMPLE 2 | TORAY INDUSTRIES, INC., TORAYFAN #50-2500S | 0.19 | NOT PERFORMED | × |
| COMPARATIVE EXAMPLE 3 | TOYOBO CO., LTD., GW703#135 | 0.26 | NOT PERFORMED | △ |

INKJET IMAGE FORMING APPARATUS

INCORPORATION BY REFERENCE

This application is based on and claims the benefit of priority from Japanese patent application No. 2024-001821 filed on Jan. 10, 2024, which is incorporated by reference in its entirety.

BACKGROUND

The present disclosure relates to an inkjet image forming apparatus which forms an image on a printing base material by an inkjet method.

In the inkjet image forming apparatus, corona discharge is sometimes applied to the printing base material in order to improve adhesion between the printing base material and ink.

For example, an amount of the corona discharge may be set with reference to a table for associating the paper base material (corresponding to the printing base material) with a type of the ink.

However, in the above case, the corona discharge treatment is performed to compensate for a difference in glossiness between a printed area and a non-printed area, and characteristics of the printing base material are not considered.

SUMMARY

An ink jet image forming apparatus according to the present disclosure includes an image forming part, a corona discharge treatment unit, and a control part. The image forming part ejects ink based on image data on a printing base material conveyed in a predetermined conveyance direction to form an image. The corona discharge treatment unit is disposed on an upstream side of the head unit in the conveyance direction and performs a corona discharge on the printing base material. The control part controls a discharge amount of the corona discharge performed by the corona discharge treatment unit. The control part controls the discharge amount based on an arithmetic average roughness of the printing base material.

The above and other objects, features, and advantages of the present disclosure will become more apparent from the following description when taken in conjunction with the accompanying drawings in which a preferred embodiment of the present disclosure is shown by way of illustrative example.

BRIEF DESCRIPTION OF THE DRAWINGS

FIG. 5 is a table showing an evaluation result of adhesion, in the inkjet image forming apparatus according to the embodiment of the present disclosure.

DETAILED DESCRIPTION

Hereinafter, with reference to the attached drawings, an inkjet image forming apparatus according to one embodiment of the present disclosure will be described.

Figure 1:
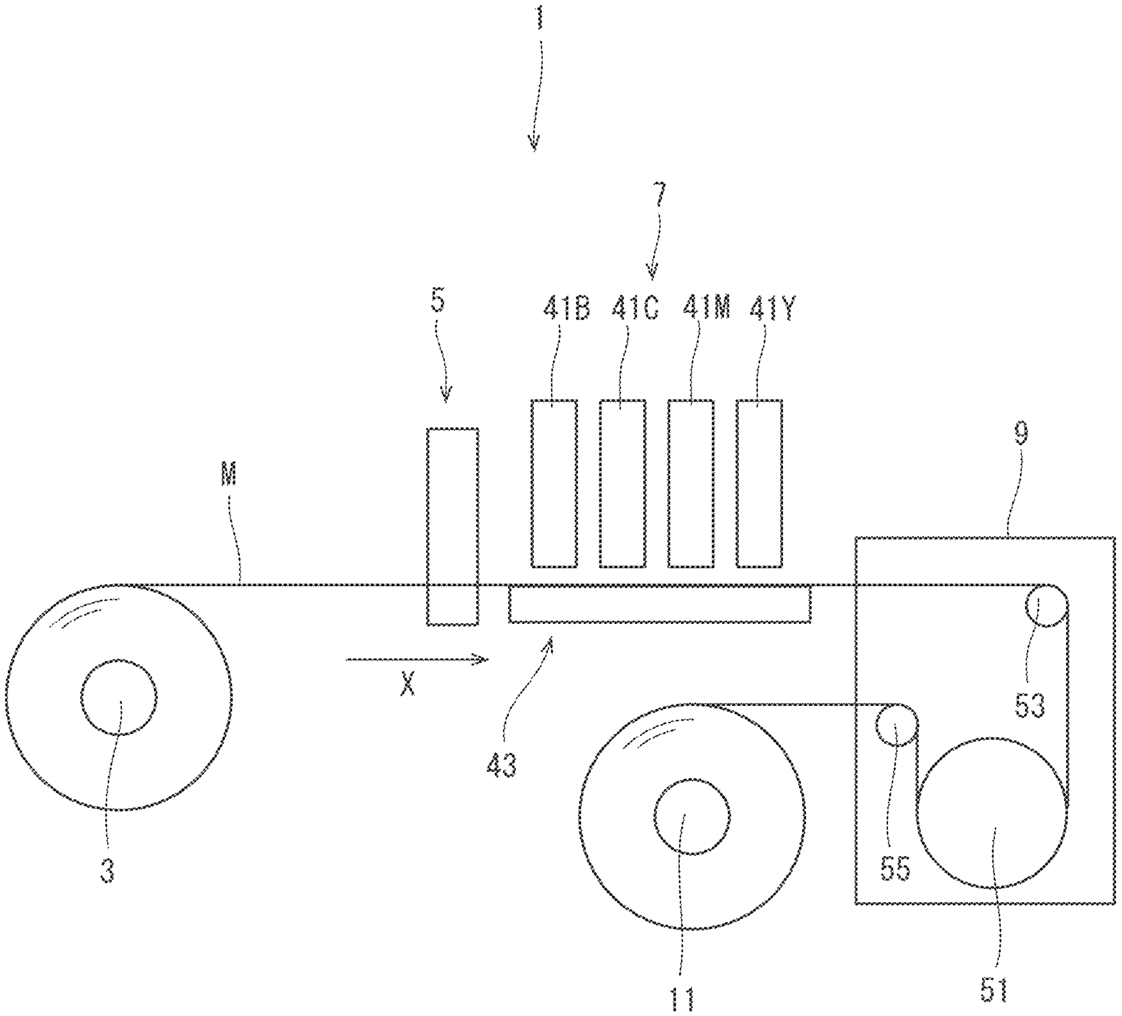
FIG. 1 is a front view schematically showing an inkjet image forming apparatus according to one embodiment of the present disclosure.

With reference to FIG. 1, the entire structure of the inkjet image forming apparatus 1 will be described. FIG. 1 is a front view schematically showing the internal structure of the inkjet image forming apparatus 1.

The inkjet image forming apparatus 1 includes a supply roller 3, a corona treatment unit 5, an image forming part 7, a drying part 9, and a winding roller 11 in the order of a conveyance direction X of a printing base material M.

First, the supply roller 3 will be described. The printing base material M is wound around the supply roller 3. When the supply roller 3 rotates, the printing base material M is fed out in the conveyance direction X.

Figure 2:
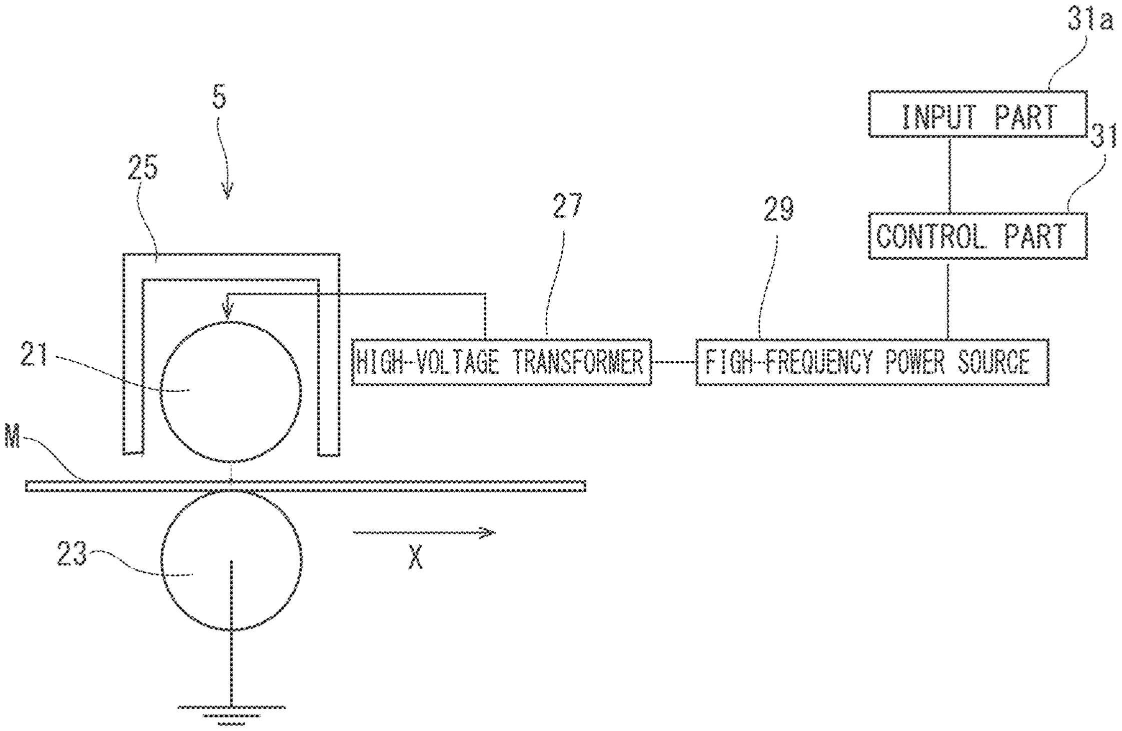
FIG. 2 is a view schematically showing a corona treatment unit in the inkjet image forming apparatus according to the embodiment of the present disclosure.

Next, the corona treatment unit 5 will be described with reference to FIG. 2. FIG. 2 is a view schematically showing the corona treatment unit 5. The corona treatment unit 5 is arranged on the downstream side of the supply roller 3 in the conveyance direction X. The corona treatment unit 5 is provided with a corona discharge electrode 21 and a counter roller 23 arranged at a predetermined interval from the corona discharge electrode 21. The corona discharge electrode 21 is made of, for example, rod-shaped ceramic or aluminum cylinder coated with ceramic, elongated in the width direction Y of the printing base material M. The counter roller 23 is made of, for example, stainless steel cylinder, and is grounded. An interval between the corona discharge electrode 21 and the counter roller 23 is, for example, 0.5 to 2.0 mm. Tension rollers may be arranged on the upstream side and the downstream side of the counter roller 23.

The corona discharge electrode 21 is covered with an electrode cover 25 whose lower surface is opened. The corona discharge electrode 21 is connected to a high-frequency power source 29 through a high-voltage transformer 27. The high-frequency power source 29 generates a high-frequency AC current. The high-frequency AC current is, for example, 5.5 kV to 6.5 kV. The higher the discharge power, the higher the discharge voltage (discharge amount). However, since the discharge voltage varies depending on an atmospheric pressure, temperature and humidity, or the others, the discharge voltage is set depending on environmental conditions when the corona discharge treatment is actually performed. The high-voltage transformer 27 amplifies the generated high-frequency AC current, converts it into discharge power, and applies it to the corona discharge electrode 21. Thus, corona discharge is generated between the corona discharge electrode 21 and the counter roller 23.

The high-frequency power source 29 is electrically connected to a control part 31, and generates a high-frequency AC current based on an instruction from the control part 31.

Next, the image forming part 7 will be described with reference to FIG. 1. The image forming part 7 is arranged on the downstream side of the corona treatment unit 5 in the conveyance direction X. The image forming part 7 is provided with four head units 41B, 41C, 41M, and 41Y corresponding to inks of four colors (black, cyan, magenta, and yellow) (collectively referred to as a head unit 41), and a conveying plate 43 on which the printing base material M is conveyed along the surface.

Figure 3:
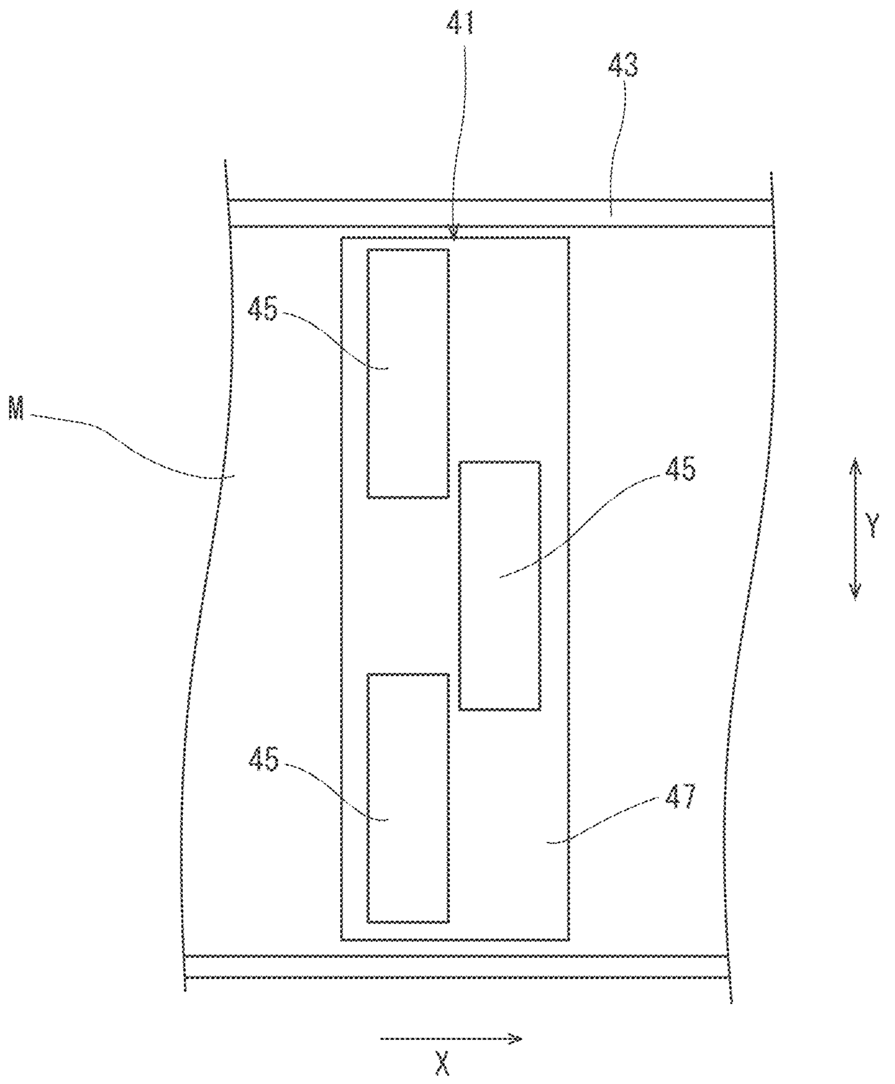
FIG. 3 is a plan view schematically showing a head unit in the inkjet image forming apparatus according to the embodiment of the present disclosure.

The head unit 41 will be described with reference to FIG. 3. FIG. 3 is a plan view showing the head unit 41. The head unit 41 includes three print heads 45 and a plate 47 for supporting the three print heads 45.

As shown in FIG. 3, the three print heads 45 are disposed in a staggered pattern along the width direction Y (a line head system) so as to have the same width as that of the printing base material M, and are supported by the plate 47. The print head 45 includes a number of nozzles (not shown). The ejection port of the nozzle is opened on the lower surface of the print head 45.

As shown in FIG. 1, the four head units 41B, 41C, 41M, and 41Y are arranged in order along the conveyance direction X, and the ink of black, cyan, magenta and yellow are supplied respectively. The supplied ink is ejected downward from the ejection port of the nozzle of each print head 45.

As shown in FIG. 1, the conveying plate 43 is disposed below the four head units 41. The upper surface of the conveying plate 43 is formed flat. As shown in FIG. 3, a width of the conveying plate 43 is wider than a width of the printing base material M and all the head units 41. A heat source (not shown) is provided below the conveying plate 43 to heat the conveying plate 43 to a predetermined temperature. The conveying plate 43 is made of metal, for example.

Next, the drying part 9 will be described with reference to FIG. 1. The drying part 9 is arranged on the downstream side of the image forming part 7 in the conveyance direction X. The drying part 9 includes a heat drum 51, and upstream-side and downstream-side tension rollers 53 and 55 arranged on the upstream side and the downstream side of the heat drum 51. The printing base material M passing through the image forming part 7 is wound around the heat drum 51 between the upstream-side and downstream-side tension rollers 53 and 55. The heat drum 51 is heated to dry the printing base material M conveyed along the surface.

Next, the winding roller 11 will be described. The winding roller 11 is arranged on the downstream side of the drying part 9 in the conveyance direction X. The end of the printing base material M is fixed to the winding roller 11. The winding roller 11 is connected to a motor (not shown) and rotated. By rotating the winding roller 11 in a predetermined direction at a predetermined rotational speed by the motor, the printing base material M is fed out from the supply roller 3.

The fed printing base material M passes between the corona discharge electrode 21 and the counter roller 23 of the corona treatment unit 5 (see FIG. 2), and is conveyed to the image forming part 7. In the image forming part 7, the printing base material M is conveyed toward the drying part 9 along the upper surface of the conveying plate 43 under the four head units 41. Then, after being wound around the heat drum 51 in the drying part 9, it is wound up by the winding roller 11.

Next, the control part 31 will be described. As shown in FIG. 2, the control part 31 controls the high-frequency power source 29 of the corona treatment unit 5 to t generate a high-frequency current of a predetermined intensity. Further, the control part 31 includes an input part 31*a* such as a display panel. The input part 31*a* includes an arithmetic average roughness input part to which an arithmetic average roughness (for example, an arithmetic average roughness defined in JP JIS B0601:2001) of the printing base material M is input. The control part 31 is also electrically connected to the head units 41, and controls the head units 41 based on the input image data.

The image forming operation of the inkjet image forming apparatus 1 having the above configuration will be described. In the image forming operation, first, the user inputs an arithmetic average roughness of the printing base material M to the input part 31*a* of the control part 31. When the input arithmetic average roughness is 3 μm or lower, the control part 31 controls the corona treatment unit 5 so as to perform the corona discharge treatment.

Thereafter, the motor is driven to rotate the winding roller 11, and the printing base material M is fed from the supply roller 3 to the corona treatment unit 5. In the corona treatment unit 5, corona discharge is generated between the corona discharge electrode 21 and the counter roller 23, and the upper surface of a printing base material M is subjected to the corona discharge. On the other hand, when the input arithmetic average roughness is larger 0.3 μm, the control part 31 controls the corona treatment unit 5 so as not to perform the corona discharge treatment. That is, when the input arithmetic average roughness is larger 0.3 μm, the corona discharge treatment is not performed.

Thereafter, the printing base material M is conveyed below the head units 41, and the ink of a predetermined color is ejected from the corresponding head unit 41 based on the image data to form an image on the printing base material M. The printing base material M on which the image is formed is conveyed to the drying part 9. In the drying part 9, the ink is completely dried. Thereafter, the printing base material M is wound up by the winding roller 11.

As described above, according to the present disclosure, the corona discharge is applied to the printing base material M when an arithmetic average roughness of the printing base material M is a constant value or lower, more specifically, 0.3 μm or lower. The printing base material M having a large arithmetic average roughness has fine irregularities on its surface, and the ink easily enters the irregularities (anchor effect), thereby enhancing the adhesion between the ink and the printing base material M.

However, the printing base material M such as a plastic film or synthetic paper having an arithmetic average roughness of 0.3 μm or lower has low adhesion to the ink. Therefore, by performing the corona discharge treatment, the adhesion the printing base material M and the ink can be enhanced. That is, when the printing base material M is subjected to the corona discharge treatment, fine irregularities are formed on the surface of the printing base material M, and the above-mentioned anchor effect is obtained. Further, hydrophilic polar groups such h as carbonyl groups, carboxyl groups and nitrides are formed on the surface of the printing base material M. Such a polar group enhances a wettability of the surface of the printing base material M. Therefore, the physical and chemical actions of the corona discharge treatment improve a compatibility (adhesion) between the printing base material M and the ink.

In order to improve the compatibility (adhesion) between the printing base material M and the ink, a precoating treatment using a precoating liquid may be performed. However, in the precoating treatment, since the liquid is applied to the printing base material M, it is necessary to dry the printing base material M, and it is necessary to increase a treatment time for the drying time or to provide a drying device. In the corona discharge treatment, the effect equivalent to the precoating treatment can be obtained without using a liquid. However, the precoating treatment may be applied together depending on a type of the ink.

Next, a test in which a relationship between the arithmetic average roughness and the adhesion is evaluated in the inkjet image forming apparatus 1 of the present embodiment will be described. The printing base material M is an OPP film having an arithmetic average roughness of 0.08 μm. The arithmetic average roughness is a value defined in JISB0601:2001 measured using a surface roughness measuring instrument (Product name: FORMATRACER Avant FTA-H4D3000 D, manufactured by Mitutoyo Co., Ltd.). A width of the printing base material M is 210 mm, and a conveying speed of the printing base material M is 3 m/min. The adhesion is evaluated by a peeling test.

Figure 4A:
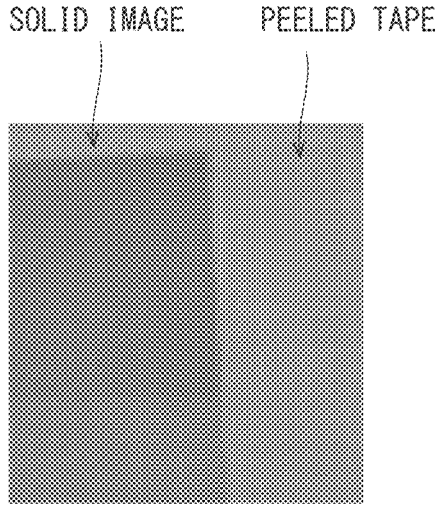
FIG. 4A shows an image (Present Example) after a tape peeling test, in the inkjet image forming apparatus according to the embodiment of the present disclosure.
Figure 4B:
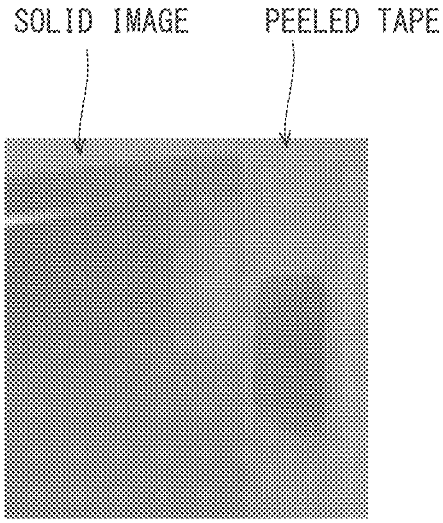
FIG. 4B shows an image (Comparative Example) after the tape peeling test, in the inkjet image forming apparatus according to the embodiment of the present disclosure.

The peeling test is carried out by the following method. A cyan solid image is printed on the printing base material M at 600 dpi. The printed image is subjected to a peeling test based on JISK5600 (no cross-cut is formed). A tape (Product name: CT, manufactured by NICHIBAN) is firmly rubbed onto the image with a fingertip, and within 5 minutes, the tape is peeled off, or the edge of the tape is grasped at an angle of about 60 degrees and firmly pulled away within 0.5 to 1.0 seconds. The images after the peeling are shown in FIG. 4A and FIG. 4B. The peeled tape is attached to the right side of the printing base material on the left side. FIG. 4A shows Present Example of the present disclosure and FIG. 4B shows Comparative Example.

In Present Example, the corona discharge is applied to the printing base material by the corona treatment unit 5. The discharge power is 100 W (discharge voltage is 6.3 kV). In Comparative Example, the corona discharge is not applied to the printing base material. As can be seen from FIG. 4A and FIG. 4B, in Present Example (see FIG. 4A), the ink is not peeled from the printing base material and is not adhered to the peeled tape. On the other hand, in Comparative Example (see FIG. 4B), the ink is peeled off from the printing base material and adhered to the peeled tape.

Next, with reference to the table of FIG. 5, a result of evaluation of the adhesion in Present Example and Comparative Example will be described. The adhesion is evaluated by the following methods. In the peeling test described above, an unused tape and the peeled tape are stuck to a copy paper (Product name C2, manufactured by Fujifilm Business Innovation Co., Ltd.), and an image density is measured using an image density meter (Product name FD-5, manufactured by Konica Minolta). When a difference in image density between the unused tape and the peeled tape is less than 0.005, it is shown by ○, when the difference is less than 0.15, it is shown by Δ, and when the difference is 0.15 or larger, it is shown by X. Present Examples 1 to 3 show the printing base material having an arithmetic average roughness of 0.03 μm or lower, to which the corona discharge treatment is applied. Present Example 4 shows the printing substrate having an arithmetic average roughness larger than 0.03 μm without being applied with the corona discharge treatment. Comparative Examples 1 to 3 show the printing base material having an arithmetic average roughness of 0.03 μm or lower, to which the corona discharge treatment is not applied.

It is found from the table that good adhesion is obtained by the corona discharge treatment even when an arithmetic average roughness is 0.3 μm or lower (Present Examples 1 to 3). When an arithmetic average roughness is larger than 0.3 μm (Present Example 4), the adhesion is good without being applied with the corona discharge treatment. On the other hand, when the arithmetic average roughness is 0.3 μm or lower (Comparative Examples 1 to 3), it is found that sufficient adhesion is not obtained. From these results, it is understood that the corona discharge treatment is necessary when an arithmetic average roughness of the printing base material is 0.3 μm or lower.

The control part 31 may control the corona treatment unit 5 so that the larger the arithmetic average roughness, the higher the voltage applied to the corona discharge electrode 21. In this case, even when the arithmetic average roughness of the printing base material M is large and the adhesion to the ink is low, the adhesion to the ink can be enhanced.

Although the above embodiments used the head units 41 of the four colors, the present disclosure is not limited to the four colors, but may be more or lower than four colors. The head unit 41 is not limited to a line head system. However, the line head system is preferable because the printing speed can be increased. Although a long plastic film (PET film) is used as the printing base material M, a cut film may be used.

While the present disclosure has been described with respect to specific embodiments, the present disclosure is not limited to the above embodiments. Those skilled in the art may modify the above embodiments without departing from the scope and spirit of the present disclosure.

The invention claimed is:

1. An inkjet image forming apparatus comprising:

an image forming part which ejects ink based on image data on a printing base material conveyed in a predetermined conveyance direction to form an image;

a corona discharge treatment unit which is disposed on an upstream side of the head unit in the conveyance direction and performs a corona discharge on the printing base material; and a control part which controls a discharge amount of the corona discharge performed by the corona discharge treatment unit, wherein the control part controls the discharge amount based on an arithmetic average roughness of the printing base material.

2. The inkjet image forming apparatus according to claim 1, wherein the control part includes an input part to which the arithmetic average roughness of the printing base material is input.

3. The inkjet image forming apparatus according to claim 1, wherein the control part controls the corona discharge treatment unit so as to perform the corona discharge when the arithmetic average roughness of the printing base material is 0.3 μm or lower.

4. The inkjet image forming apparatus according to claim 1, wherein the printing base material is a plastic film.

* * * * *